Patented Mar. 31, 1936

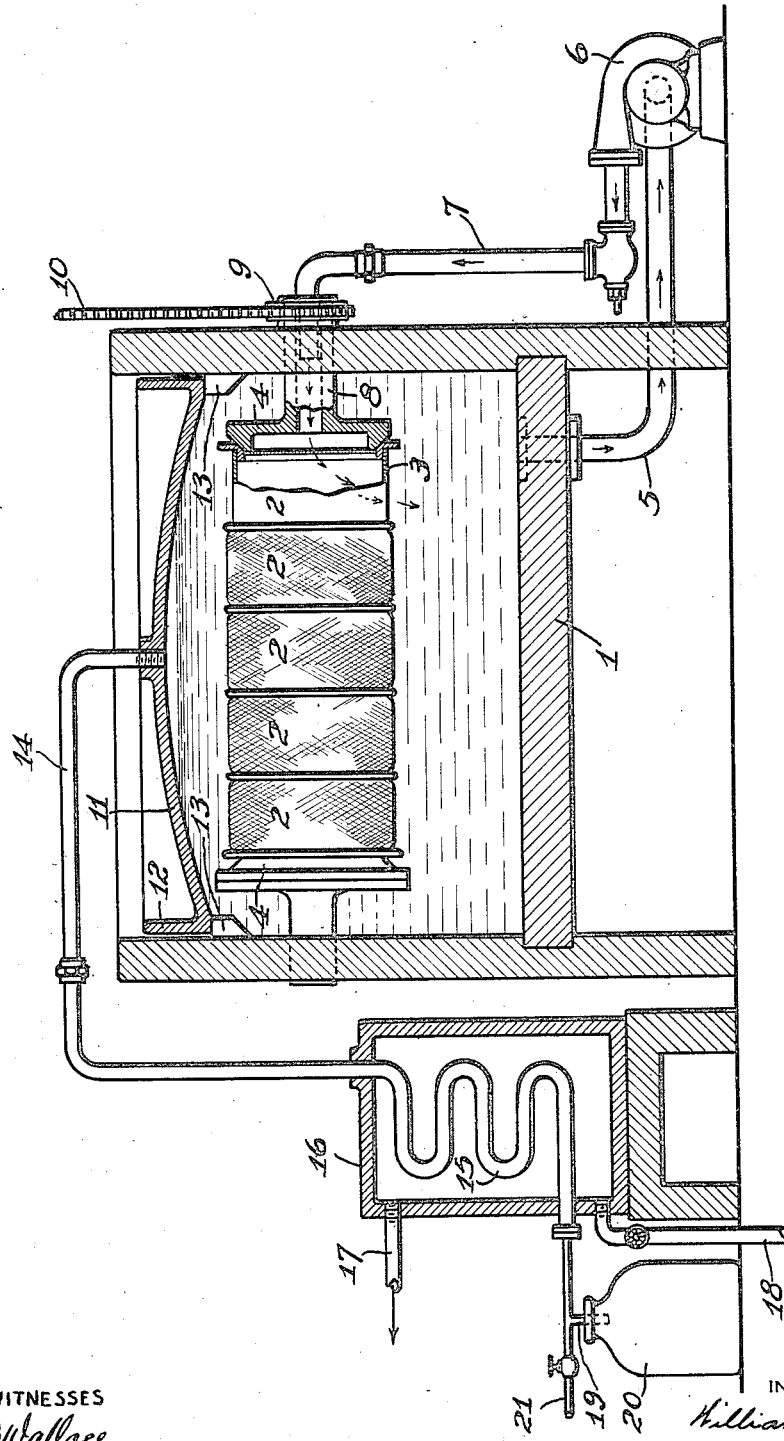

2,035,981

UNITED STATES PATENT OFFICE 2,035,981

RECOVERY OF CARBON DISULPHIDE FROM VISCOSE PRODUCTS

William F. Richter, Apollo, Pa., assignor to Chemical Holding Corporation, Apollo, Pa., a corporation of Delaware Application February 28, 1931, Serial No. 519,099

3 Claims. (Cl. 23—206)

This invention relates to the manufacture of viscose products, and particularly to the recovery of carbon disulphide liberated during curing of such products.

Viscose products, such as rayon silk, artificial straw, artificial horse hair and the like, before being cured contain carbon disulphide which is liberated during curing. Thus it may be freed during washing treatment with water if the temperature of the wash water is not too low, and it is liberated by the ordinary desulphurizing treatments. The practice heretofore has been to permit the carbon disulphide liberated during this step to escape to the atmosphere, no means for its recovery having been available. This has increased the manufacturing cost of such products, for the carbon disulphide used in the production of xanthate represents a substantial part of the cost.

It is among the objects of this invention to provide a method of recovering carbon disulphide from viscose products, which is simple, does not interfere with the curing operations, and may be practiced without any substantial modification of existing treating processes and apparatus.

A further object is to provide an apparatus for use in the practice of the method provided by the invention, which is of simple and efficient construction and operation, and does not require skilled attention.

The invention may be described in connection with the accompanying drawing, which shows a longitudinal section through a treating apparatus embodying the preferred construction.

In accordance with this invention viscose products are treated in a closed chamber with a liquid and at a temperature adapted to liberate carbon disulphide, and the vapors formed are withdrawn from the chamber and treated to condense and recover the carbon disulphide. The invention may be embodied or combined with customary curing operations, for instance a washing step. In such case the temperature must be such as to liberate the carbon disulphide. In washing with water the evolution becomes appreciable with water at about 45° C., and suitably it is applied at about 50° C. Water does not remove chemically combined sulphur, and desulphurizing treatments are resorted to for this purpose. These treatments liberate carbon disulphide also, and because of this dual action of such treatment the use of desulphurizing solutions constitutes the preferred embodiment.

The method thus provided may be practiced in various types of apparatus. The invention also provides an especially suitable apparatus comprising an open top vat, of the type now commonly used in the curing of viscose products, provided with a removable cover adapted to cooperate with the treating solution to form a closed chamber, and with means for withdrawing and condensing carbon disulphide vapors from the space above the treating solution.

The invention will be described more in detail with reference to the treatment of rayon by its preferred embodiment. Having reference to the drawing, the form of apparatus shown comprises an open top treating vat 1 adapted to hold desulphurizing solution. The material to be desulphurized, for example rayon, is supported in the vat in any suitable manner. For example, cakes 2 of rayon thread are wound upon a drum 3 suspended in the vat by means of rotatably mounted heads 4.

In the preferred embodiment of the invention the treating liquid is circulated through the viscose product in the vat. Circulation of the treating liquid through the product during desulphurization accelerates the treatment and renders it more efficient than is the case if the rayon is merely immersed in the solution. For this purpose the desulphurizing solution is drawn from the vat through a pipe 5 by means of a pump 6 which passes the liquid through a pipe 7 to the interior of the drum, and for this purpose one of the heads 4 is provided with a hollow trunnion 8 connected to pipe 7. To insure uniformity of treatment the drum is preferably rotated, as by means of a sprocket wheel 9 connected to trunnion 8, and a sprocket chain 10 driven in any conventional manner, not shown.

The top of the vat is closed by means of a removable cover which may be raised and lowered vertically. In the apparatus shown the cover comprises a dome-shaped head 11 provided with a vertical peripherally disposed flange 12. The cover makes a close fit with the sides of vat 1, and to close the vat it is lowered until its edge dips into the solution, thereby forming a liquid seal. The cover may rest upon lugs 13 connected to the walls of the tank below the normal liquid level, as shown in the drawing. Centrally of the head there is provided a vapor take-off pipe 14 which extends to a condensing system, such as a coil 15 disposed within a tank 16 through which cooling water is circulated by means of pipes 17 and 18. Suitable line couplings, not shown, are provided so that the cover may be raised and lowered to open or close the vat as need be. The liquid carbon disulphide formed in the condenser flows through a drain line 19 into a receiver 20, and the non-condensible vapors are exhausted through a by-pass 21.

The interior of head 11 is preferably dome-shaped, so as to provide a small or restricted vapor space above the treating solution. By this construction the vapors are high in carbon disulphide, which is advantageous. The cooling effect in the take-off line causes condensation which produces a slight suction, sufficient to cause the vapors to flow from the vat. In order to assist the drawing off of the heavy carbon disulphide vapors pipe 14 preferably slopes downwardly from the cover. Removal of the vapors may be accelerated, if desired, by increasing the suction, as by means of a vacuum pump connected to by-pass 21.

In the use of this apparatus the rayon to be treated is placed in vat 1 and after the vat has been closed by cover 11 the desulphurizing solution is circulated and the drum is rotated. The desulphurizing agent commonly used comprises an aqueous solution of an alkali metal sulphide, such as sodium sulphide. The solution is used at an elevated temperature, for example about 65° C., as this accelerates the treatment and volatilizes substantially all of the carbon disulphide from the solution. The mixed vapors containing the liberated carbon disulphide rise to the vapor space above the solution, and they pass into vapor take-off line 14, from whence they flow through the condenser 15. The carbon disulphide in the vapors is here condensed and runs into receiver 20.

Although the invention has been described with particular reference to rayon, it is equally applicable to other viscose products. Likewise, the treament may be effected as a water washing operation. In such case the water is passed through the material and allowed to pass to a waste line. This may be done, for instance, by passing fresh water into the drum, the water in the vat then being withdrawn through a drain suitably arranged to maintain a practically constant liquid line. This is to produce the restricted vapor space referred to. As before, the product is preferably rotated or agitated during treatment.

The practice of the invention affords in a simple and inexpensive manner a substantial recovery of carbon disulphide as such. This may be used for xanthating alkali cellulose in the production of further viscose. It also minimizes the danger which has been present in prior practice, in which these toxic and highly flammable vapors escaped into the air.

The apparatus may be varied in many ways, as for example by the use of vertically disposed holders for the viscose product undergoing treatment, by the use of tanks of other construction than that shown, or by the use of fixed, or non-rotating, holders for the product being treated. Also circulation of the liquid may be effected in other ways than that described. And as will be understood in the art, the product need not be treated on spools or drums, but may be processed in the form of skeins, and in other ways forming conventional practice in curing treatments.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. The process of recovering free carbon disulphide directly from viscose products during curing thereof, comprising treating said viscose product in a closed chamber with an aqueous solution of alkali metal sulphide which is substantially inert to carbon disulphide and at a temperature adapted to liberate carbon disulphide from said product and vaporize it, drawing the vapors from said chamber, and condensing and recovering carbon disulphide from said vapors.

2. That method of recovering carbon disulphide during curing of viscose products which comprises the steps of treating said viscose product with an aqueous solution of alkali metal sulphide in a closed chamber, said solution being warmed to a temperature adapted to vaporize carbon disulphide, drawing the vapors from the chamber, and condensing and recovering the carbon disulphide from said vapors.

3. A method according to claim 2 in which said alkali metal sulphide comprises sodium sulphide.

WILLIAM F. RICHTER.